United States Patent [19]
Prasad et al.

[11] Patent Number: 5,888,272
[45] Date of Patent: Mar. 30, 1999

[54] PROCESS FOR ENRICHED COMBUSTION USING SOLID ELECTROLYTE IONIC CONDUCTOR SYSTEMS

[75] Inventors: Ravi Prasad, East Amherst; Christian Friedrich Gottzmann, Clarence; Raymond Francis Drnevich, Clarence Center; Nitin Ramesh Keskar, Grand Island; Hisashi Kobayashi, Putnam Valley, all of N.Y.

[73] Assignee: Praxair Technology, Inc., Danbury, Conn.

[21] Appl. No.: 868,962

[22] Filed: Jun. 5, 1997

[51] Int. Cl.$^6$ ................................................. B01D 53/22
[52] U.S. Cl. .......................................... 95/54; 95/45; 96/4
[58] Field of Search .................................. 95/43, 45, 54; 96/4, 8, 10

[56] References Cited

U.S. PATENT DOCUMENTS

| | | | |
|---|---|---|---|
| 4,545,787 | 10/1985 | Hegarty | 55/16 |
| 5,051,113 | 9/1991 | Nemser | 95/54 |
| 5,053,059 | 10/1991 | Nemser | 95/54 |
| 5,118,395 | 6/1992 | Chen et al. | 95/54 X |
| 5,160,713 | 11/1992 | Mazanec et al. | 423/210 |
| 5,169,415 | 12/1992 | Roettger et al. | 95/54 |
| 5,174,866 | 12/1992 | Chen et al. | 95/54 X |
| 5,306,411 | 4/1994 | Mazanec et al. | 204/265 |
| 5,354,547 | 10/1994 | Rao et al. | 95/45 X |
| 5,435,836 | 7/1995 | Anand et al. | 95/45 |
| 5,447,555 | 9/1995 | Yee et al. | 95/54 |
| 5,516,359 | 5/1996 | Kang et al. | 95/14 |
| 5,547,494 | 8/1996 | Prasad et al. | 95/54 |
| 5,562,754 | 10/1996 | Kang et al. | 95/54 |
| 5,643,354 | 7/1997 | Agrawal et al. | 75/490 |
| 5,733,435 | 3/1998 | Prasad et al. | 95/54 |
| 5,753,007 | 5/1998 | Russek et al. | 95/41 |

FOREIGN PATENT DOCUMENTS

| | | |
|---|---|---|
| 0747108 | 12/1996 | European Pat. Off. . |
| 778069 | 6/1997 | European Pat. Off. . |

OTHER PUBLICATIONS

Kobayashi, "Oxygen Enriched Combustion System Performance Study" U.S. Department of Energy (1988).

Kobayashi et al., "Technical and Economic Evaluation of Oxygen Enriched Combustion Systems for Industrial Furnace Applications", Industrial Combustion Technology Symposium (1986).

*Primary Examiner*—Robert Spitzer
*Attorney, Agent, or Firm*—Douglas E. Denninger

[57] ABSTRACT

A process for separating a feed gas stream into an oxygen-enriched gas stream which is used in a combustor and an oxygen-depleted gas stream. The feed gas stream is compressed, and oxygen is separated from the compressed feed gas stream using an ion transport module including an ion transport membrane having a retentate side and a permeate side. The permeate side of the ion transport membrane is purged with at least a portion of a combustion product gas stream obtained from the combustion in the combustor of the gas stream exiting the permeate side of the ion transport module.

18 Claims, 4 Drawing Sheets

PROCESS FOR ENRICHED COMBUSTION USING SOLID ELECTROLYTE IONIC CONDUCTOR SYSTEMS

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

The invention relates to the integration of oxygen enhanced combustion with oxygen separation processes that employ solid electrolyte ionic conductor membranes, and more particularly, to the integration of these processes to improve the economic efficiency and pollution-related problems of combustion processes.

BACKGROUND OF THE INVENTION

Many different oxygen separation systems, for example, organic polymer membrane systems, have been used to separate selected gases from air and other gas mixtures. Air is a mixture of gases which may contain varying amounts of water vapor and, at sea level, has the following approximate composition by volume: oxygen (20.9%), nitrogen (78%), argon (0.94%), with the balance consisting of other trace gases. An entirely different type of membrane, however, can be made from certain inorganic oxides. These solid electrolyte membranes are made from inorganic oxides, typified by calcium- or yttrium-stabilized zirconium and analogous oxides having a fluorite or perovskite structure.

Some of these solid oxides have the ability to conduct oxygen ions at elevated temperatures if an electric potential is applied across the membrane, that is, they are electrically-driven or ionic conductors only. Recent research has led to the development of solid oxides which have the ability to conduct oxygen ions at elevated temperatures if a chemical driving potential is applied. These pressure-driven ionic conductors or mixed conductors may be used as membranes for the extraction of oxygen from oxygen-containing gas streams if a sufficient partial oxygen pressure ratio is applied to provide the chemical driving potential. Since the selectivity of these materials for oxygen is infinite and oxygen fluxes generally several orders of magnitude higher than for conventional membranes can be obtained, attractive opportunities are created for the production of oxygen using these ion transport membranes.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 600° C.–900° C. range. This limitation remains despite much research to find materials that work well at lower temperatures. Solid electrolyte ionic conductor technology is described in more detail in Prasad et al., U.S. Pat. No. 5,547,494, entitled Staged Electrolyte Membrane, which is hereby incorporated by reference to more fully describe the state of the art.

Combustion processes, however, usually operate at high temperature and therefore there is the potential for efficiently integrating ion transport systems with oxygen enhanced combustion processes and the present invention involves novel schemes for the integration of ion transport systems with oxygen enhanced combustion processes.

Most conventional combustion processes use the most convenient and abundant source of oxygen, that is, air. The presence of nitrogen in air does not benefit the combustion process and, on the contrary, may create many problems. For example, nitrogen reacts with oxygen at combustion temperatures, forming nitrogen oxides ($NO_x$), an undesirable pollutant. In many instances, the products of combustion must be treated to reduce nitrogen oxide emissions below environmentally acceptable limits. Moreover, the presence of nitrogen increases the flue gas volume which in turn increases the heat losses in the flue gas and decreases the thermal efficiency of the combustion process. To minimize these problems, oxygen-enriched combustion (OEC) has been commercially practiced for many years. There are several benefits of oxygen-enriched combustion including reduced emissions (particularly nitrogen oxides), increased energy efficiency, reduced flue gas volume, cleaner and more stable combustion, and the potential for increased thermodynamic efficiency in downstream cycles. These benefits of OEC, however, must be weighed against the cost of the oxygen that has to be manufactured for this application. As a consequence, the market for OEC is greatly dependent on the cost of producing oxygen-enriched gas. It has been estimated that as much as 100,000 tons per day of oxygen would be required for the new markets in OEC if the cost of oxygen-enriched gas could be reduced to about $15/ton. It appears that gas separation processes employing ion transport membranes have the promise of reaching that goal. OEC is discussed in detail in H. Kobayashi, Oxygen Enriched Combustion System Performance Study, Vol. 1: *Technical and Economic Analysis* (Report #DOE/ID/12597), 1986, and Vol. 2: *Market Assessment* (Report #DOE/ID/12597-3), 1987, Union Carbide Company-Linde Division, Reports for the U.S. Dept. of Energy, Washington, D.C.).

Literature related to ion transport conductor technology for use in separating oxygen from gas stream include:

Hegarty, U.S. Pat. No. 4,545,787, entitled *Process for Producing By-Product Oxygen from Turbine Power Generation*, relates to a method of generating power from a compressed and heated air stream by removing oxygen from the air stream, combusting a portion of the resultant air stream with a fuel stream, combining the combustion effluent with another portion of the resultant air stream, and expanding the final combustion product through a turbine to generate power. Hegarty mentions the use of silver composite membranes and composite metal oxide solid electrolyte membranes for removing oxygen from the air stream.

Kang et al., U.S. Pat. No. 5,516,359, entitled *Integrated High Temperature Method for Oxygen Production*, relates to a process for separating oxygen from heated and compressed air using a solid electrolyte ionic conductor membrane where the nonpermeate product is heated further and passed through a turbine for power generation.

Mazanec et al., U.S. Pat. No. 5,160,713, entitled, *Process for Separating Oxygen from an Oxygen-Containing Gas by Using a Bi-containing Mixed Metal Oxide Membrane*, discloses bismuth-containing materials that can be used as oxygen ion conductors.

Publications related to oxygen-enriched or enhanced combustion (OEC) include the above-mentioned U.S. Dept. of Energy reports authored by H. Kobayashi and H. Kobayashi, J. G. Boyle, J. G. Keller, J. B. Patton and R. C. Jain, *Technical and Economic Evaluation of Oxygen*

*Enriched Combustion Systems for Industrial Furnace Applications*, in Proceedings of the 1986 Symposium on Industrial Combustion Technologies, Chicago, Ill., Apr. 29–30, 1986, ed. M. A. Lukasiewics, American Society for Metals, Metals Park, Ohio, which discusses the various technical and economic aspects of oxygen-enhanced combustion systems.

Oxygen-enriched combustion has been commercially practiced using oxygen manufactured by either cryogenic distillation or noncryogenic processes such as pressure swing adsorption (PSA). All of these processes operate at or below 100° C. and therefore are difficult to thermally integrate with combustion processes.

Research on solid electrolyte ionic conductors has been carried out for many years. Solid electrolytes have mainly been used in fuel cells and sensors, and to experimentally produce small quantities of pure oxygen from air, taking advantage of the infinite selectivity for oxygen transport. Electrically-driven solid electrolyte membranes have also been used for removing traces of oxygen from inert gas streams, where the application of a sufficient voltage to the membrane can reduce the oxygen activity of the retentate gas stream to a very low value. Many of these materials, however, did not have appreciable oxygen ion conductivity. Only recently have materials been synthesized that have sufficiently high oxygen ion conductivities so as to make the gas separation process economically viable. Commercial gas separation, purification, or enrichment processes based on these materials have yet to be developed. Also, methods for integrating oxygen separation with oxygen-enriched combustion have not been discussed in the prior art.

The inventors are unaware of the prior disclosure of a process configuration for the integration of an ion transport based oxygen production system with OEC.

OBJECTS OF THE INVENTION

It is therefore an object of the invention to eliminate the need for a stand-alone oxygen generator or an oxygen supply system and provide an efficient integrated process for oxygen-enhanced combustion by thermally and operationally integrating the various operations of the process.

It is another object of the invention to minimize or eliminate $NO_x$ formation in the combustor processes and thermal losses due to heating of nitrogen gas.

It is yet another object of the invention to recover a nitrogen-rich gas stream from the ion transport module to be used as a co-product.

It is another object of the invention to control concentration of the oxygen in the exhaust gas stream used in the combustion process.

SUMMARY OF THE INVENTION

The invention comprises a process for separating a feed gas stream containing elemental oxygen into an oxygen-enriched gas stream and an oxygen-depleted gas stream wherein the oxygen-enriched gas stream is used in a combustor, said process comprising the steps of (a) compressing the feed gas stream; (b) separating the oxygen from the compressed feed gas stream using an ion transport module including an ion transport membrane having a retentate side and a permeate side to separate a purified oxygen gas stream on the permeate side and correspondingly depleting the oxygen on the retentate side to produce the oxygen-depleted gas stream, the purified oxygen gas stream mixing with other gas components on the permeate side to form the oxygen-enriched gas stream; and (c) purging the permeate side of the ion transport membrane with at least a portion of a combustion product gas stream obtained from the combustion in the combustor of the gas stream exiting the permeate side of the ion transport module.

In a preferred embodiment of the invention, the feed gas stream is air. In another preferred embodiment of the invention, the combustion product gas stream used to purge the permeate side of the ion transport membrane includes a reactive gas that reacts with the purified oxygen gas stream permeating through the ion transport membrane. In another preferred embodiment of the invention, the combustion product gas stream is cooled before it is used to purge the permeate side of the ion transport membrane. In yet another preferred embodiment, the gas stream exiting the permeate side of the ion transport module has an oxygen concentration of from about 10% to about 90%. In another preferred embodiment of the invention, the feed gas stream is compressed before it is fed into the ion transport module. In another preferred embodiment of the invention, the combustor is integrated with the ion transport module on the permeate side of the ion transport membrane.

In another preferred embodiment of the invention, at least a portion of the combustion product gas stream is used in a downstream process and at least a portion of a downstream product gas stream from the downstream process may be used to purge the permeate side of the ion transport membrane. In another embodiment of the invention, an oxygen-containing gas stream is added to at least a portion of a downstream product gas stream from the downstream process and the resultant gas stream is passed through an afterburner to burn any fuel that remains in the downstream product gas stream. In yet another preferred embodiment of the invention, both the combustor and the downstream process are integrated with the ion transport module on the permeate side of the ion transport membrane. In other preferred embodiments of the invention, the downstream process involves the oxidation of metals, the purification of metals by oxidizing impurities in the metals, or a blast furnace.

BRIEF DESCRIPTION OF THE DRAWINGS

Other objects, features and advantages of the invention will occur to those skilled in the art from the following description of preferred embodiments and the accompanying drawings, in which.

DETAILED DESCRIPTION OF THE INVENTION

Figure 1:
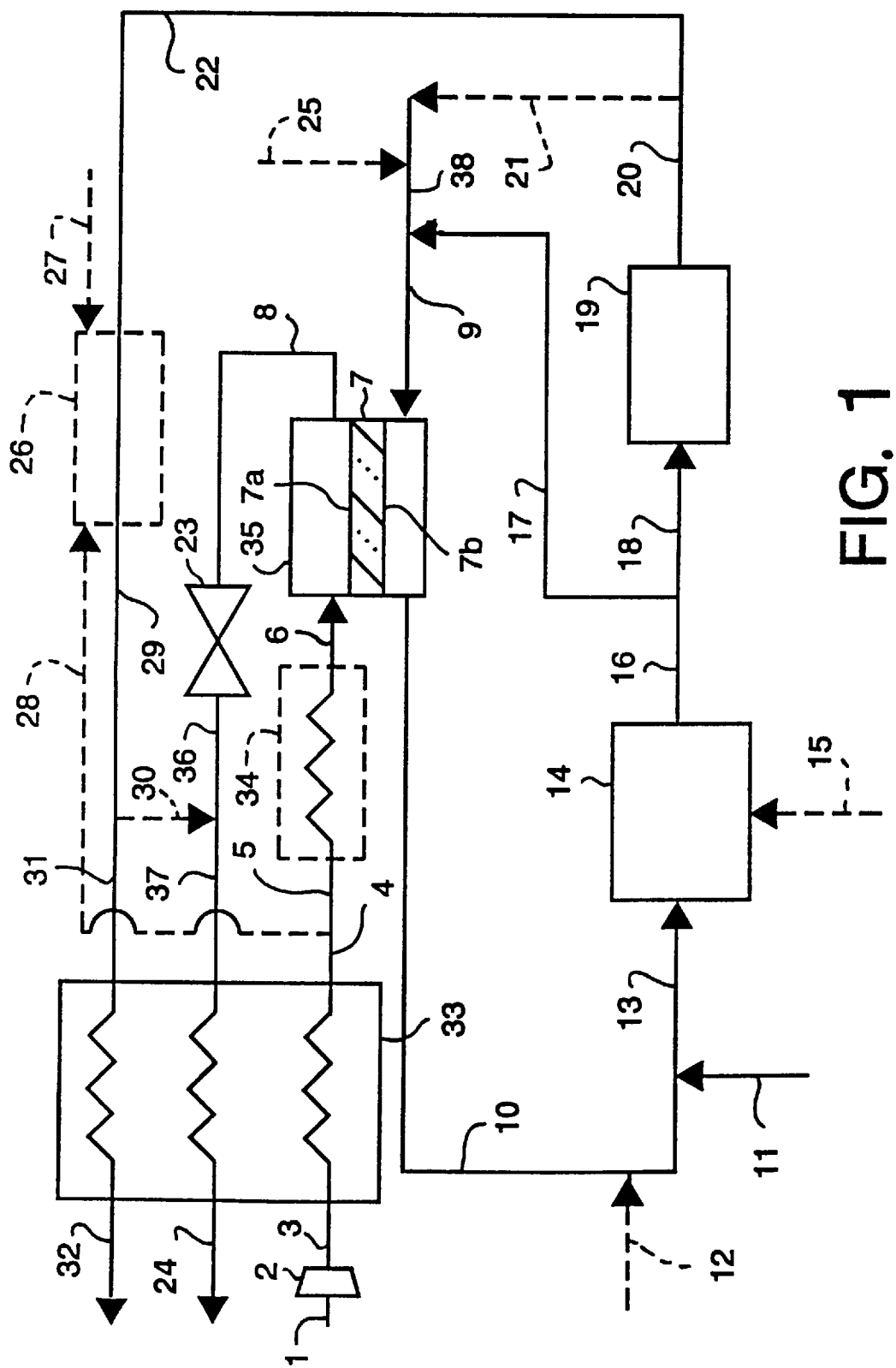
FIG. 1 is a schematic diagram showing the integration of ion transport oxygen production with oxygen-enriched combustion and a downstream process.

The invention will now be described in detail with reference to the Figures in which like reference numerals are used to indicate like elements.

The present invention discloses process configurations that enable the economically attractive integration of ion transport oxygen production with oxygen-enriched combustion (OEC). Although pressure-driven processes are preferred for the simplicity of their design, the concepts described here are applicable to systems utilizing either an ionic-conductor-only membrane having electrodes and an external circuit for electron return or a mixed conductor membrane.

Current commercial oxygen production processes typically operate at temperatures below 100° C. Because of this low temperature they do not gain significant efficiencies by integration with an OEC process. The elevated temperatures of operation (usually greater than 600° C.) makes ion transport process intrinsically well suited for integration with high temperature processes, such as combustion, that use oxygen. In addition, it will be shown that the combustion exhaust flue gases can be beneficially used to enhance ion transport membrane performance. Traditional oxygen production processes (for example, PSA, TSA or membrane-based processes) cannot easily take advantage of the exhaust flue gases because of their high temperature when they leave the combustion chamber.

The essence of the current process configuration is an ion transport membrane that employs a solid oxygen ion conducting or mixed conducting membrane to separate oxygen from an oxygen-containing gas, typically, but not necessarily, air, and to utilize the oxygen separated in a downstream process including, but not limited to, oxygen-enriched combustion. To reduce the partial pressure of oxygen on the permeate side in the ion transport membrane, an oxygen-depleted gas (for example, waste gases from the combustion process or any downstream process) is used as a purge gas stream. Such purging greatly enhances the driving force across the ion transport membrane and effects a high oxygen flux and a lower membrane area requirement.

These benefits are accrued even when the feed gas stream is at a relatively low pressure thereby reducing the power requirements of the system to that of practical interest. Recirculation of the combustion exhaust gas is also beneficial because it provides a diluent stream that is important for controlling the temperature in the combustor and minimizing $NO_x$ formation (for example, from infiltrating nitrogen). Efficiency of this process could also be enhanced by adding fuel to the flue gas entering the oxygen separator. This further reduces the partial pressure oxygen on the permeate side, resulting in even higher oxygen fluxes in the ion transport separator. In some embodiments of the invention, the ion transport module can also function as the combustor, thereby eliminating the need for a separate combustor, unless the application requires a gas stream exiting the combuster at a temperature above 1100° C., the maximum operating temperature of many current ion transport membranes. It should be noted that the heat necessary to maintain the temperature of the ion transport module within the operating range can come from a variety of sources known to those skilled in the art, including, for example, heat generated in an afterburner and recirculated hot combustion product gases, among others.

In most mixed conductors, the electronic conductivity greatly exceeds the oxygen ion conductivity at the operating temperatures of interest, and the overall transport of oxygen from one side to the other is controlled by the oxygen ion conductivity. A number of potential mixed conductors have been identified in both the fluorite and perovskite crystal structures. The behavior of ion transport membranes has been extensively studied (for example, for fuel cells) and can be accurately modeled. Table 1 is a partial list of mixed conductors of interest for oxygen separation.

TABLE I

Material composition

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. $SrMnO_{3-\delta}$
   $SrMn_{1-x}Co_xO_{3-\delta}$ ($0 \leq x \leq 1$, $0 \leq y \leq 1$, $\delta$ from stoichimetry)
   $Sr_{1-x}Na_xMnO_{3-\delta}$
3. $BaFe_{0.5}Co_{0.5}YO_3$
   $SrCeO_3$
   $YBa_2Cu_3O_{7-\delta}$ ($0 \leq \beta \leq 1$, $\beta$ from stoichimetry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_xA''_x$, $B_yB'_yB''_y$, $O_{3-z}$ (x, x', x", y, y', y" all in 0–1 range)
   where: A, A', A" = from groups 1, 2, 3 and f-block lanthanides
   B, B', B" = from d-block transition metals

| | | | |
|---|---|---|---|
| 6. (a) Co—La—Bi type: | Cobalt oxide | 15–75 mole % |
| | Lanthanum oxide | 13–45 mole % |
| | Bismuth oxide | 17–50 mole % |
| (b) Co—Sr—Ce type: | Cobalt oxide | 15–40 mole % |
| | Strontium oxide | 40–55 mole % |
| | Cerium oxide | 15–40 mole % |
| (c) Co—Sr—Bi type: | Cobalt oxide | 10–40 mole % |
| | Strontium oxide | 5–50 mole % |
| | Bismuth oxide | 35–70 mole % |
| (d) Co—La—Ce type: | Cobalt oxide | 10–40 mole % |
| | Lanthanum oxide | 10–40 mole % |
| | Cerium oxide | 30–70 mole % |
| (e) Co—La—Sr—Bi type: | Cobalt oxide | 15–70 mole % |
| | Lanthanum oxide | 1–40 mole % |
| | Strontium oxide | 1–40 mole % |
| | Bismuth oxide | 25–50 mole % |
| (f) Co—La—Sr—Ce type: | Cobalt oxide | 10–40 mole % |
| | Lanthanum oxide | 1–35 mole % |
| | Strontium oxide | 1–35 mole % |
| | Cerium oxide | 30–70 mole % |

TABLE I-continued

Material composition

7. $Bi_{2-x-y}M'_xM_yO_{3-\delta}$ ($0 \leq x \leq 1, 0 \leq y \leq 1$, $\delta$ from stoichimetry)
   where: M' = Er, Y, Tm, Yb, Tb, Lu, Nd, Sm, Dy, Sr, Hf, Th, Ta, Nb,
   Pb, Sn, In, Ca, Sr, La and mixtures thereof
   M = Mn Fe, Co, Ni, Cu and mixtures thereof
8. $BaCe_{1-x}Gd_xO_{3-x/2}$ where,
   x equals from zero to about 1.
9. One of the materials of $A_sA'_tB_uB'_vB''_wO_x$ familyi whose composition is
   disclosed in U.S. Pat. No. 5,306,411 (Mazanec et al.) as follows:
   A represents a lanthanide or Y, or a mixture thereof;
   A' represents an alkaline earth metal or a mixture thereof,
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B"
   in the formula; and $0.9 < (s + t)/(u + v + w) < 1.1$
10. One of the materials of $La_{1-x}Sr_xCu_{1-y}M_yO_{3-\delta}$ family, where:
    M represnts Fe or Co;
    x equals from zero to about 1;
    y equals from zero to about 1;
    $\delta$ equals a number that satisfies the valences of La, Sr, Cu, and M
    in the formula.
11. One of the materials of $Ce_{1-x}A_xO_{2-\delta}$ family, where:
    A represents a lanthanide, Ru, or Y; or a mixture thereof;
    x equals from zero to about 1;
    $\delta$ equals a number that satisfies the valences of Ce and A in the
    formula.
12. One of the materials of $Sr_{1-x}Bi_xFeO_{3-\delta}$ family, where:
    A represents a lanthanide or Y, or a mixture thereof;
    x equals from zero to about 1;
    $\delta$ equals a number that satisfies the valences of Ce and A in the
    formula.
13. One of the materials of $Sr_xFe_yCo_zO_w$ family, where:
    x equals from zero to about 1;
    y equals from zero to about 1;
    z equals from zero to about 1;
    w equals a number that satisfies the valences of Sr, Fe and Co in
    the formula.
14. Dual phase mixed conductors (electronic/ionic):
    $(Pd)_{0.5}/(YSZ)_{0.5}$
    $(Pt)_{0.5}/(YSZ)_{0.5}$
    $(B-MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature
    metallic phase (e.g., Pd, Pt, Ag, Au, Ti, Ta, W) is added.

FIG. 1 is a schematic diagram showing the integration of ion transport oxygen production with oxygen-enriched combustion. During operation, feed gas stream 1 containing elemental oxygen, usually air, is compressed to a relatively low pressure in blower or compressor 2 to produce compressed feed gas stream 3 which is heated in heat exchanger 33 against waste gas stream 31 and product nitrogen gas stream 37 to produce warmed feed gas stream 4. Gas stream 28 may be divided from warmed feed gas stream 4 and used in optional afterburner 26 to leave feed gas stream 5 which is optionally heated in heater 34 to produce hot feed gas stream 6. Hot feed gas stream 6 then enters the feed side of ion transport module 35 employing ion transport membrane 7 having a retentate side 7a and a permeate side 7b. A portion of the oxygen in hot feed gas stream 6 is removed in ion transport module 35 and the exiting gas stream 8 becomes nitrogen-enriched with respect to feed gas stream 1. The permeate side 7b of ion transport membrane 7 is purged using purge gas stream 9 containing products of combustion. Permeate gas stream 10 contains oxygen and this gas stream 10 is later mixed with fuel gas stream 11. Air stream 12 can be optionally added to gas stream 10.

Combustible gas stream 13, after passing through an optional blower (not shown), then enters combustor 14. Optionally or in addition to fuel gas stream 11, fuel gas stream 15 can be fed directly to combustor 14. By operating combustor 14 close to stoichiometric or slightly fuel-rich condition, the oxygen concentration in exhaust gas stream 16 can be maintained at low levels. In this embodiment exhaust gas stream 16 from combustor 14 is split into two portions, gas stream 17 and gas stream 18. Gas stream 18 is used in downstream process 19 that requires heat input and the relatively cooler exhaust gas stream 20 from downstream process 19 may also be split into two portions, exhaust gas stream 21 and exhaust gas stream 22. Fuel gas stream 25 may be added to exhaust gas stream 21 to produce gas stream 38.

Gas stream 38 can be added to gas stream 17 to produce gas stream 9 which enters ion transport module 35 and is used to purge the permeate side 7b of ion transport membrane 7. Although not shown herein, gas stream 17 can be used to heat warmed feed gas stream 5 by heat exchange to produce hot feed gas stream 6 rather than using optional heater 34. Exhaust gas stream 22 optionally fed into an optional afterburner 26 where air stream 27 or gas stream 28 are optionally added to produce hot waste gas stream 29. Hot waste gas stream 29 may become gas stream 30 or gas stream 31. As mentioned above, gas stream 31 is used in heat exchanger 33 to heat compressed feed gas stream 3 to produce waste gas stream 32. Gas stream 30 may be mixed with nitrogen-rich retentate gas stream 8 if nitrogen is not to be used as a co-product and if the temperature of exhaust gas stream 30 is adequately high. Retentate gas stream 8 is likely to be at a higher pressure than exhaust gas stream 30 and it may be necessary to release the excess pressure of retentate gas stream 8 using expansion valve 23 to produce retentate gas stream 36 before it is mixed with gas stream 30. If retentate gas stream 24 is desired as a nitrogen-rich product gas stream, gas streams 36 and 30 are not mixed.

The use of an oxygen-depleted purge gas stream 9 in ion transport module 35 will greatly lower the oxygen partial pressure on the permeate side 7b of ion transport membrane 7 and enable rapid oxygen transport through membrane 7. Fuel gas streams 11, 15, and 25 can be introduced into the process configuration at any or all of the points shown in FIG. 1 to obtain the benefits of the invention; the use of at least one fuel gas stream is essential for the invention. For example, it may be desirable to add fuel gas stream 25 upstream of ion transport module 35 to greatly reduce the oxygen partial pressure on the permeate side 7b of ion transport membrane 7. This would also result in some heat generation in ion transport module 35 due to fuel combustion, thereby offsetting some of the heating requirements of the oxygen transport process. In this case, the exiting nitrogen-rich gas stream 8 from ion transport module 35 would be made hotter. This would make the heat transfer in heat exchanger 33 more efficient, thereby reducing the area required for the heat exchange and potentially eliminating the need for heater 34 upstream of ion transport module 35. If enough fuel can be combusted in ion transport module 35 on the purge or permeate side 7b of ion transport membrane 7, it may altogether eliminate the need for a separate combustor 14, that is, ion transport module 35 would also serve as the combustor (as described in FIG. 3). In such a situation, significant system simplification and cost reduction may result.

Reactive purge arrangements are disclosed in "Reactive Purge for Solid Electrolyte Membrane Gas Separation", U.S. Ser. No. 08/567,699, filed Dec. 5, 1995 and incorporated herein by reference. Preferred configuration for ion transport modules utilizing a reactive purge are disclosed in "Solid Electrolyte Ionic Conductor Reactor Design", U.S. Ser. No. 08/848,204 [Attorney Docket No. D-20352], filed Apr. 29, 1997 and also incorporated herein by reference. Both applications are commonly owned with the present application.

It may be advantageous to operate combustor 14 with a slightly fuel-rich mixture because this will lead to partial oxidation of the fuel added to permeate gas stream 10, resulting in an exhaust gas stream 16 containing hydrogen gas and carbon monoxide. As mentioned above, gas stream 17 is optionally used to purge the permeate side 7b of ion transport membrane 7. It should be noted that hydrogen gas is a highly reducing gas with a higher reactivity than many other gaseous fuels, and its presence in ion transport module 35 will result in an extremely low oxygen partial pressure on the purge side 7b of ion transport membrane 7 and this will enable an even more rapid transport of oxygen through ion transport membrane 7. Of course, similar results could be achieved by introducing hydrogen gas as fuel gas stream 25, however, it will not be cost-effective as the fuel-rich feed to combuster 14, since hydrogen gas is a relatively expensive fuel. The use of a fuel-rich feed to combuster 14 as described obviates the need for a use of a pre-produced hydrogen gas, since hydrogen gas is produced as a part of the process cycle. Running combustor 14 in a fuel-rich condition, however, could cause exhaust gas streams 18 and 22 to contain carbon monoxide and hydrogen gas, both of which can be simply vented to the atmosphere if the concentration is low. As mentioned above, it may be possible, however, to install afterburner 26 (perhaps catalytic) to which excess air 27 is added to burn off the carbon monoxide and hydrogen gas if their concentration is sufficiently high. Gas stream 28 of warmed feed gas stream 4 could also be added to afterburner 26 to provide for the afterburner requirements.

It is interesting to note that by virtue of the recirculation of combustion products as purge gas stream 9, and because of the infinite selectivity of ion transport membrane 7 for oxygen, it is possible to limit the temperature rise of gas stream 13 in combuster 14 without the need for excess air and thereby exclude nitrogen from the combustion process, which eliminates $NO_x$ formation. This synergistic effect is a general principle of the invention and is a feature of many of the embodiments of the invention.

Typical ranges for operating parameters of the ion transport module used in the invention are as follows.

Temperature: Typically in the 400°–1000° C. range, and preferably in the 400°–800° C. range.

Pressure: The purge side pressure will be typically in 1–3 atm. range. The feed side pressure will be 1–3 atm. if nitrogen is not a co-product, and 1–20 atm. if nitrogen is a co-product.

Oxygen ion conductivity ($\mu_i$) of the Ion Transport Membrane: Typically in the 0.01–100 S/cm range (1 S=1/ohm).

Thickness of the Ion Transport Membrane: The ion transport membrane can be employed in the form of a dense film, or a thin film supported on a porous substrate. The thickness (t) of the ion transport membrane/layer will be typically less than 5000 microns; preferably less than 1000 microns, and most preferably less than 100 microns.

Configuration: The ion transport membrane elements may be tubular or planar

As mentioned above, asymmetric or composite ion transport membranes (that is, pressure-driven membranes) are used in the examples discussed herein. The following properties are based on typical values reported in the literature for such membranes as could be used in the present invention.

Effective membrane thickness: 20 micron
Ionic conductivity, $\mu_i$: 0.5 S/cm
Operating temperature: 800° C.
Substrate porosity: 40%

Standard mathematical models have been employed to determine the operating conditions for the process shown in FIG. 1, that is, the membrane area requirement and the power and thermal energy inputs required at various points. This example, modeling a process using a configuration of FIG. 1, is for illustrative purposes only and no attempt has been made to optimize the process configuration. The major reason why optimization is not attempted is that optimization is generally based on economic considerations and the commercial production of ion transport membrane systems is yet far from being mature, and no reliable cost estimates are presently available on such systems.

For the present example, looking at FIG. 1, fuel is added only to the process as fuel gas stream 11. In addition, optional gas stream 17 is not considered, that is, gas streams 16 and 18 are identical. Furthermore, nitrogen is not sought as a co-product and retentate gas stream 36, obtained from retentate gas stream 8 after reducing the excess pressure of the retentate using release valve 23, is mixed with gas stream 30, taken from exhaust gas stream 29. In general, however, it is not effective to lower the pressure of retentate gas stream 8 or to add gas stream 30 to retentate gas stream 8 upstream of heat exchanger 33. Since exhaust gas stream 22 does not contain carbon monoxide and hydrogen gas, afterburner 26 is not installed.

Basis for the example: A downstream process requiring a heat input of 5 million BTU/hr.

is removed in ion transport module 46 and the exiting gas stream 48 becomes nitrogen-enriched with respect to feed gas stream 41.

The permeate side 47b of ion transport membrane 47 is purged using purge gas stream 79 containing products of combustion. Permeate gas stream 50 contains oxygen and this gas stream 50 is later mixed with fuel gas stream 51. Air stream 52 can be optionally added to gas stream 50. Combustible gas stream 53, after passing through an optional blower (not shown), then enters combustor 54. Optionally or in addition to fuel gas stream 51, fuel gas stream 55 can be fed directly to combustor 54. By operating combustor 54 close to stoichiometric or slightly fuel-rich condition, the oxygen concentration in exhaust gas stream 56 can be maintained at low levels.

Exhaust gas stream 56 from combustor 54 may be split into two portions, gas stream 57 and gas stream 58. Gas stream 58 is used in downstream process 59 that requires

TABLE II

Specifications of Important Gas Streams in the Integrated Process

| Gas Stream | Press. (psia) | Temp. (C.) | Flow (100 SCFH) | Composition (mole %) | | | | |
|---|---|---|---|---|---|---|---|---|
| | | | | $O_2$ | $N_2$ | $CH_4$ | $CO_2$ | $H_2O$ |
| Feed 1 | 14.7 | 25 | 165.4 | 21 | 79 | — | — | — |
| Feed 6 to ion transport module | 20 | 800 | 165.4 | 21 | 79 | — | — | — |
| Retentate 8 | 20 | 800 | 153.7 | 15 | 85 | — | — | — |
| Purge 9 | 15 | 800 | 82.7 | trace | — | — | 33.3 | 66.7 |
| Permeate 10 | 15 | 800 | 94.4 | 12.4 | — | — | 29.2 | 58.4 |
| Fuel 11 | 15 | 25 | 5.8 | — | — | 100 | — | — |
| Combustor input 13 | 15 | 745 | 100.2 | 11.7 | — | 5.8 | 27.5 | 55 |
| Combustor exhaust 16 | 15 | 1,660 | 100.2 | trace | — | — | 33.3 | 66.7 |
| Downstream process exhaust 20 | 15 | 800 | 100.2 | trace | — | — | 33.3 | 66.7 |
| Waste 24 | 15 | 197 | 171.2 | 13.5 | 76.3 | — | 3.4 | 6.8 |

TABLE III

Specifications for Key Modules in the Integrated Process

| | |
|---|---|
| Ion transport membrane 7 area (m$^2$) | 49 |
| Feed blower or compressor 2 (efficiency = 75%) power (kW) | 58 |
| Feed heater 34 input (million BTU/hr) | 0.5 |
| Total amount of heat generated in combustor 14 (million BTU/hr) | 5.3 |
| Heat input requirement for downstream process 19 (million BTU/hr) | 5 |

Figure 2:
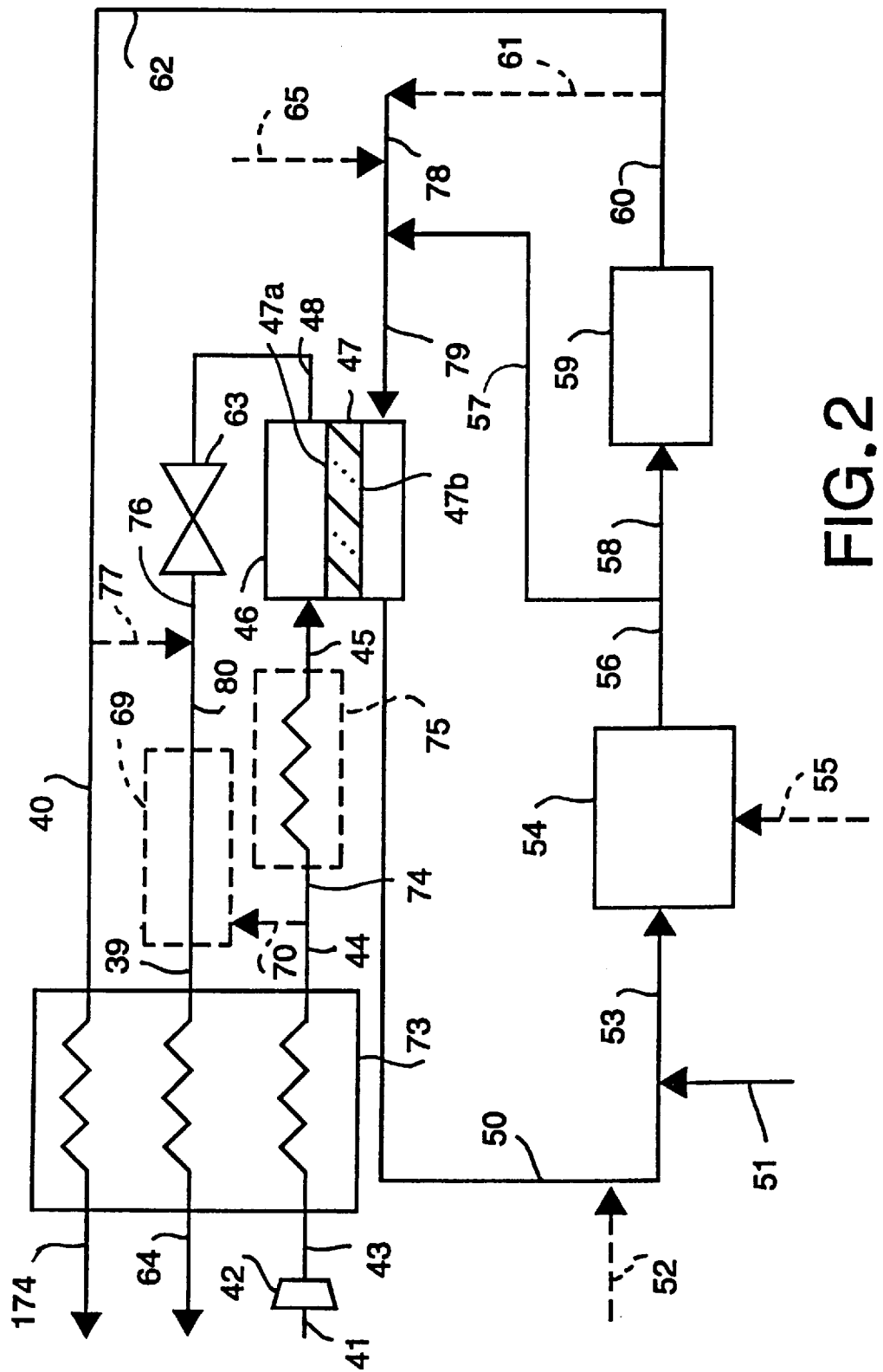
FIG. 2 is a schematic diagram showing the integration of ion transport oxygen production with oxygen-enriched combustion and a downstream process similar to FIG. 1.

FIG. 2 is a schematic diagram similar to FIG. 1 showing a more efficient alternative using the catalytic afterburner installation. During operation, feed gas stream 41 containing elemental oxygen, usually air, is compressed to a relatively low pressure in blower or compressor 42 to produce compressed feed gas stream 43 which is heated in heat exchanger 73 against hot waste gas stream 40 and product nitrogen gas stream 64 to produce warmed feed gas stream 44. Gas stream 70 may be divided from warmed feed gas stream 44 and used in optional afterburner 69 to leave feed gas stream 74 which is optionally heated in heater 75 to produce hot feed gas stream 45. Hot feed gas stream 45 then enters the feed side of ion transport module 46 employing ion transport membrane 47 having a retentate side 47a and a permeate side 47b. A portion of the oxygen in hot feed gas stream 45 heat input and the relatively cooler exhaust gas stream 60 from downstream process 59 may also be split into two portions, exhaust gas stream 61 and exhaust gas stream 62. Fuel gas stream 65 may be added to exhaust gas stream 61 to produce gas stream 78. Gas stream 78 can be added to gas stream 57 to produce gas stream 79 which enters ion transport module 46 and is used to purge the permeate side 47b of ion transport membrane 47.

Exhaust gas stream 62 may optionally be divided into two portions, hot waste gas stream 40 and gas stream 77. As mentioned above, hot waste gas stream 40 is used in heat exchanger 73 to heat compressed feed gas stream 43 to produce waste gas stream 174. Gas stream 77 may be mixed with nitrogen-rich retentate gas stream 48 if nitrogen is not to be used as a co-product and if the temperature of exhaust gas stream 77 is adequately high. The reason for this step is to remove any unreacted fuel in exhaust gas stream 62 by combustion in afterburner 69 and to also generate heat energy to improve the efficiency of heat exchanger 73. Retentate gas stream 48 is likely to be at a higher pressure than exhaust gas stream 77 and it may be necessary to release the excess pressure of retentate gas stream 48 using expansion valve 63 to produce retentate gas stream 76 before it is mixed with gas stream 77 to produce gas stream 80.

Gas stream 80 is fed into optional afterburner 69 where gas stream 70 is optionally added to produce hot waste gas stream 39. In this case one would need to make sure that stream 80 contains enough oxygen for the combustion to proceed to completion. As mentioned above, gas stream 70 taken from warmed feed gas stream 44 can be optionally added to afterburner 69 to ensure this. It should be noted that the flow rate of the combined stream is increased by blending the exhaust gases from ion transport module 46 and downstream process 59. This improves the capacity ratio in heat exchanger 73 and increases the heat transfer to compressed feed gas stream 43. Product gas stream 64 will contain oxygen (used in excess to ensure complete combustion) and products of combustion if afterburner 69 is used and product gas stream 64 is generally discarded as a waste stream As with the embodiment of the invention shown in FIG. 1, the use of an oxygen-depleted purge gas stream 79 in ion transport module 46 will greatly lower the oxygen partial pressure on the permeate side 47b of ion transport membrane 47 and enable rapid oxygen transport through membrane 47. Fuel gas streams 51, 55, and 65 can be introduced into the process configuration at any or all of the points shown in FIG. 2 to obtain the benefits of the invention and the use of at least one fuel gas stream is essential for the invention. As before, it may be desirable to add fuel gas stream 65 upstream of ion transport module 46 to greatly reduce the oxygen partial pressure on the permeate side 47b of ion transport membrane 47. This would also result in some heat generation in ion transport module 46 due to fuel combustion, thereby offsetting some of the heating requirements of the oxygen transport process. In this case, the exiting nitrogen-rich gas stream 48 from ion transport module 46 could be made hotter and this would make the heat transfer in heat exchanger 73 more efficient, thereby reducing the area required for the heat exchange and potentially eliminating the need for heater 75 upstream of ion transport module 46. If enough fuel can be combusted in ion transport module 46 on the purge or permeate side 47b of ion transport membrane 47, it may altogether eliminate the need for a separate combustor 54, that is, ion transport module 46 would also serve as the combustor (as described in FIG. 3). In such a situation, significant system simplification and cost reduction may result.

As with the embodiment of the invention shown in FIG. 1, it may be advantageous to operate combustor 54 with a slightly fuel-rich mixture because this will lead to partial oxidation of the fuel added to permeate gas stream 50, resulting in an exhaust gas stream 56 containing hydrogen gas and carbon monoxide. As mentioned above, gas stream 57 is optionally used to purge the permeate side 47b of ion transport membrane 47 and the presence of hydrogen gas in ion transport module 46 will result in an extremely low oxygen partial pressure on the purge side 47b of ion transport membrane 47 and this will enable an even more rapid transport of oxygen through ion transport membrane 47. The use of a fuel-rich feed to combuster 54 produces hydrogen gas as a part of the process cycle. As mentioned above, it may be possible, to install afterburner 69 (perhaps catalytic) to burn off the carbon monoxide and hydrogen gas if their concentration is sufficiently high.

Figure 3:
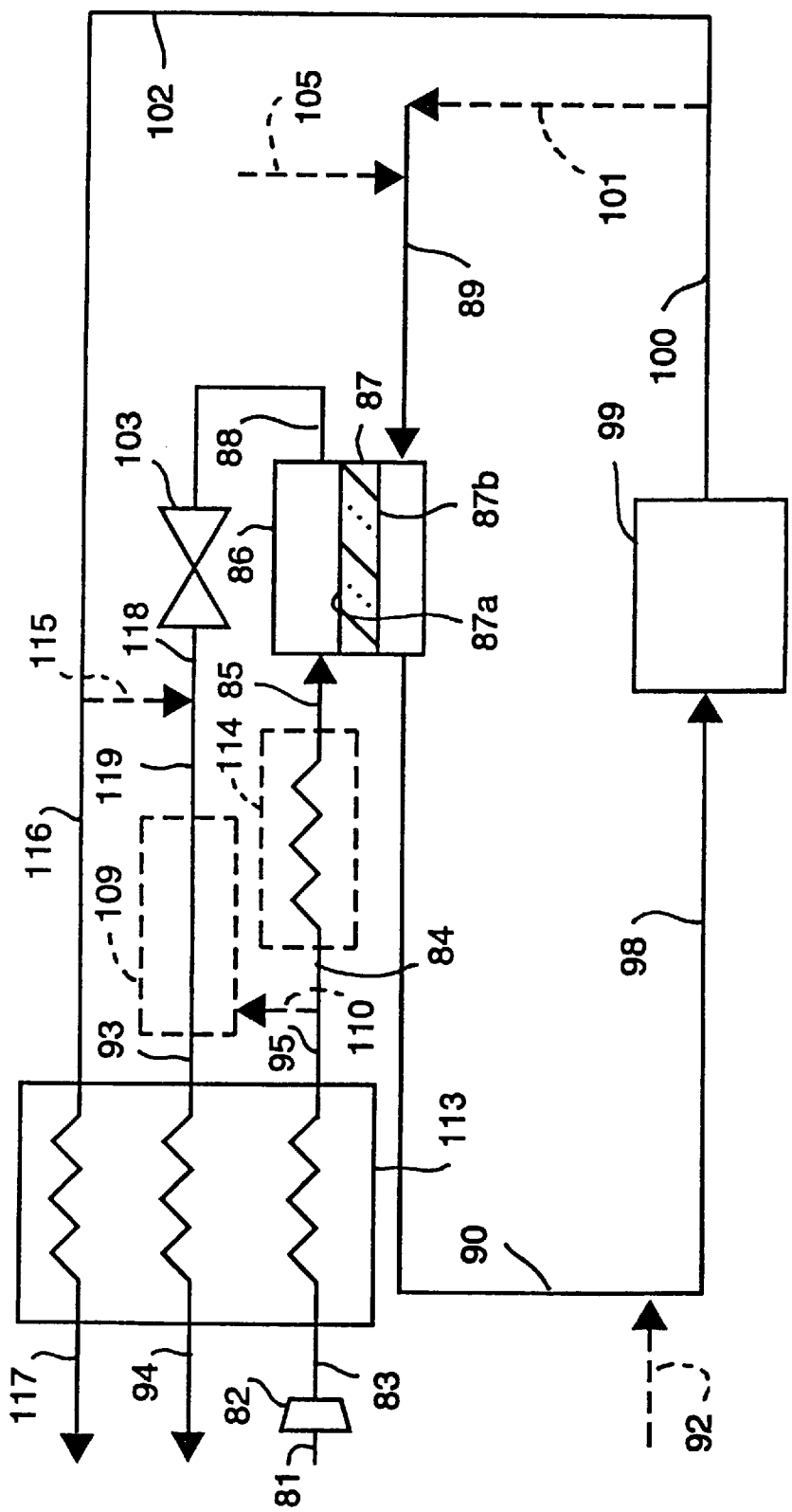
FIG. 3 is a schematic diagram similar to FIG. 2 where the combustor is integrated with the ion transport module.

FIG. 3 is a schematic diagram showing another embodiment of the invention where the combustor is integrated with the ion transport module, that is, where the ion transport module itself serves as the combustor. During operation, feed gas stream 81 containing elemental oxygen, usually air, is compressed to a relatively low pressure in blower or compressor 82 to produce compressed feed gas stream 83 which is heated in heat exchanger 113 against hot waste gas stream 116 and product nitrogen gas stream 93 to produce warmed feed gas stream 95. Gas stream 110 may be divided from warmed feed gas stream 95 and used in optional afterburner 109 to leave feed gas stream 84 which is optionally heated in heater 114 to produce hot feed gas stream 85. Hot feed gas stream 85 then enters the feed side of ion transport-combuster module 86 employing ion transport membrane 87 having a retentate side 87a and a permeate side 87b. A portion of the oxygen in hot feed gas stream 85 is removed in ion transport-combuster module 86 and the exiting gas stream 88 becomes nitrogen-enriched with respect to feed gas stream 81.

The permeate side 87b of ion transport membrane 87 is purged using purge gas stream 89 containing products of combustion and fuel. Permeate gas stream 90 contains oxygen and air stream 92 can be optionally added to gas stream 90 to produce gas stream 98. By operating ion transport module-combustor 86 close to stoichiometric or slightly fuel-rich condition, the oxygen concentration in exhaust gas stream 90 can be maintained at low levels. Gas stream 98 is used in downstream process 99 that requires heat input and the relatively cooler exhaust gas stream 100 from downstream process 99 may also be split into two portions, exhaust gas stream 101 and exhaust gas stream 102. Fuel gas stream 105 preferably is added to exhaust gas stream 101 to produce gas stream 89 which enters ion transport-combuster module 86 and is used to purge the permeate side 87b of ion transport membrane 87.

Exhaust gas stream 102 may optionally be divided into two portions, hot waste gas stream 116 and gas stream 115. As mentioned above, hot waste gas stream 116 is used in heat exchanger 113 to heat compressed feed gas stream 83 to produce waste gas stream 117. Gas stream 115 may be mixed with nitrogen-rich retentate gas stream 88 if nitrogen is not to be used as a co-product and if the temperature of exhaust gas stream 115 is adequately high. The reason for this step is to remove any unreacted fuel in exhaust gas stream 102 by combustion in afterburner 109 and to also generate heat energy to improve the efficiency of heat exchanger 113. Retentate gas stream 88 is likely to be at a higher pressure than exhaust gas stream 115 and it may be necessary to release the excess pressure of retentate gas stream 88 using expansion valve 103 to produce retentate gas stream 118 before it is mixed with gas stream 115 to produce gas stream 119.

Gas stream 119 is fed into optional afterburner 109 where gas stream 110 is optionally added to produce hot waste gas stream 93. In this case one would need to make sure that stream 119 contains enough oxygen for the combustion to proceed to completion. As mentioned above, gas stream 110 taken from warmed feed gas stream 95 can be optionally added to afterburner 109 to ensure this. It should be noted that the flow rate of the combined stream is increased by blending the exhaust gases from ion transport-combuster module 86 and downstream process 99. This improves the capacity ratio in heat exchanger 113 and increases the heat transfer to compressed feed gas stream 83. Gas stream 94 will contain oxygen (used in excess to ensure complete combustion) and products of combustion if afterburner 109 is used and gas stream 94 is generally discarded as a waste stream In the embodiment of FIG. 3, the heat of reaction generated in ion transport-combuster module 86 is removed from or consumed in the combustor in a convective and/or radiative heat transfer process. For example, ion transport membrane 87 may be formed as tubes with reactive purge gas stream 89 flowing inside the tubes. Owing to the heat generated on the purge side 87b of ion transport membrane 87 formed as tubes, the tubes will be at a high temperature and will act as heating elements. The ion transport membrane 87 tubes will radiate to the retentate side 87a or permeate side 87b where a process such as glass melting or metal annealing could be carried out. Also, a part of the heat generated in ion transport module 86 could be used to preheat compressed feed gas stream 85 and purge gas stream 89, possibly obviating the need for heat exchanger 113 and heater 114. Note that the furnace load will be placed on the permeate side 87b of ion transport membrane 87 (that is, the side with the oxidizing gas) in this case.

Figure 4:
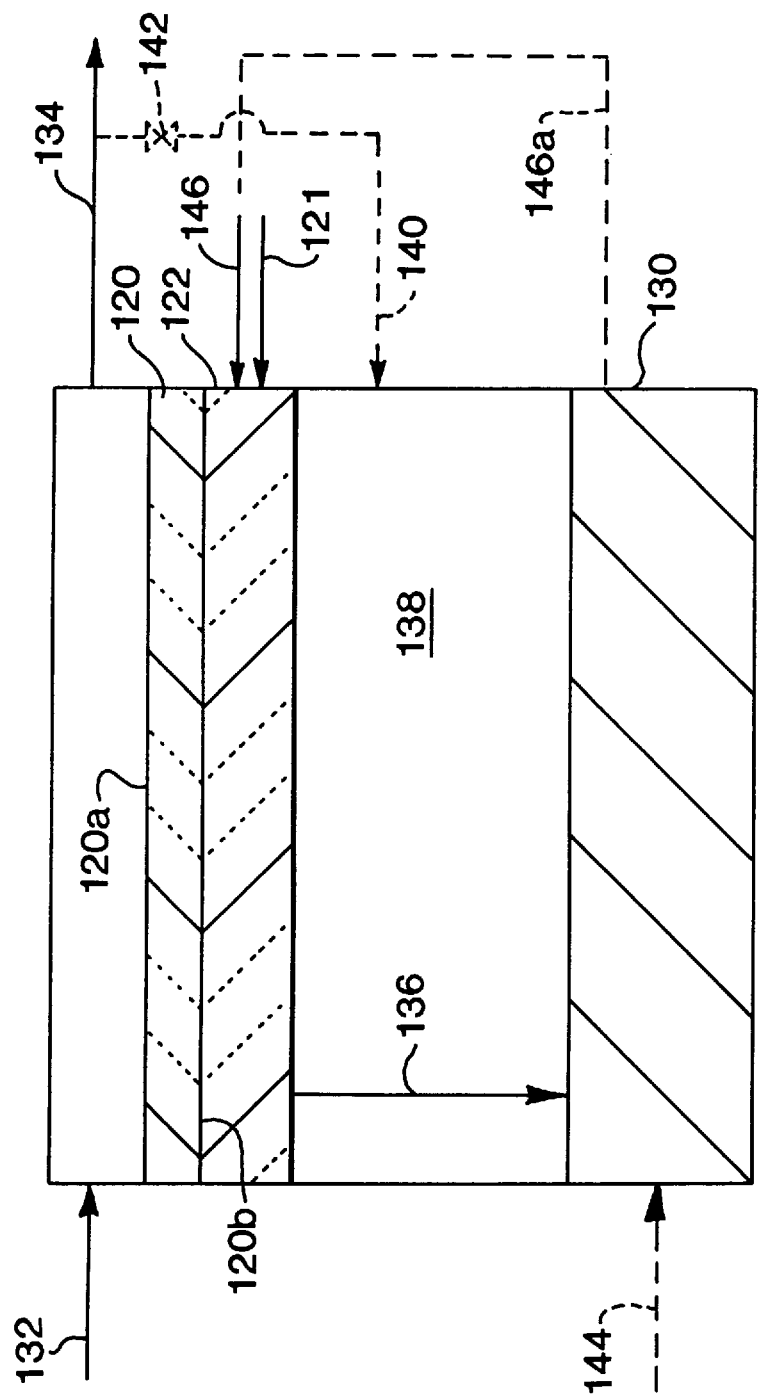
FIG. 4 is a schematic diagram showing how the ion transport process, combuster, and downstream process are integrated in a single module.

It is also possible to integrate ion transport-combuster module with an internal circulation of the flue (furnace) gas. If the furnace and the ion transport-combuster module operate at about the same temperature (for example, between 800°–1200° C.), then the ion transport-combuster module can be placed directly inside the furnace provided that the furnace atmosphere is "clean", that is, it does not contain any species detrimental to the ion transport membrane One way of implementing this idea is shown in FIG. 4 in which the ion transport process, combuster, and downstream process are all integrated in a single unit. Feed stream 132 such as heated air is directed against cathode side 120a of membrane 120 to produce hot, oxygen-depleted retentate 134 such as nitrogen. Downstream process 130 (for example, a furnace load) is shown on the permeate or anode side 120b of ion transport membrane 120. In this configuration, fuel gas stream 121 is fed close to the surface of permeate side 120b, thus sweeping away and/or efficiently consuming oxygen transported across ion transport membrane 120. The combustion products in hot zone 138 could be recirculated in the furnace against anode side 120b by natural or forced convection; for the construction shown in FIG. 4, combustion products stream 146, preferably obtained from furnace 130 as shown in phantom by stream 146a, and the fuel gas stream 121 are optionally fed through porous fuel distributor layer 122 adjacent to permeate side 120b of ion transport membrane 120. Preferably, distributor layer 122 defines at least one passage or chamber to more uniformly distribute fuel across the membrane 120.

Reacted permeate 136 containing oxygen and combustion products is directed to furnace 130 through hot zone 138. Preferably, a portion of hot nitrogen 140 is directed through valve 142 to provide an inerting atmosphere over the furnace 130. Additional fuel 144 may be added to furnace 130 as desired.

In another construction, the ion transport membrane 120 is part of a separate module that is external to the furnace 130. In either of the external or integrated constructions, a two-stage ion transport system can be established in which the anode side of the first stage is purged by the retentate stream from the first stage to produce a diluted oxygen permeate stream while the anode side of the second stage is reactively purged to produce a fuel-rich permeate stream. The two permeate streams are used in a furnace for combustion with or without use of the hot nitrogen retentate streams in the furnace atmosphere.

When the peak furnace temperature is much higher than ion transport operating temperature, a furnace zone with the "right" temperature may be selected for ion transport operation (for example, preheat section of a continuous reheat furnace), or a special chamber with proper heat sinks to control the temperature can be created. For example, in boiler applications or petroleum heaters, it would be feasible to use the furnace heat loads (that is, water or oil tubes) to create a zone of an optimum temperature for the ion transport module. A large amount of flue gas is circulated through this zone to continuously purge oxygen and keep the oxygen concentration low. Low oxygen concentration and high furnace gas circulation provide a synergy with the dilute oxygen combustion method.

There are many advantages of the integrated processes of the invention. For example, the oxygen for the OEC can be extracted from a low pressure feed gas stream by using the exhaust gas stream for purging and this should result in low power requirement for the oxygen separation process.

Because only oxygen passes through the ion transport membrane, no nitrogen is added to the purge gas stream exiting the ion transport module. Even if air is introduced into the combustion mixture, either intentionally (for example, optional gas stream 12) or by leakage, the fraction of nitrogen in the combustion mixture will be small. This should minimize or eliminate $NO_x$ formation in the combustor.

Further, by suitable blending of the exhaust gases taken before and after the downstream process, it is possible to control the purge inlet temperature to that desired in the ion transport process. This may eliminate the need for preheating the purge gas independently.

In addition, if the combustion of all the fuel can be carried out in the ion transport module, the separate combustor unit can be eliminated. This would yield significant system simplification and cost savings. Furthermore, if enough oxygen is removed from the feed gas stream in the ion transport module, then the nitrogen-rich stream retentate from the ion transport module can be used as a product. This may be most attractive if some fuel is added, for example, fuel gas stream 11. If nitrogen is desired as a co-product, it may be advantageous to compress the feed gas stream to the pressure required for product nitrogen supply. However, in this case, the retentate gas stream from the ion transport module may not be mixed with the exhaust gas stream from the downstream process. In this case, either a separate heat exchanger can be installed to recover heat from the exhaust gas stream, or no heat recovery may be attempted since generally exhaust gas stream will be much smaller and colder as compared to the retentate gas stream.

Moreover, the use of the purge gas stream decreases the oxygen concentration on the permeate side of the ion transport membrane The reduced oxygen concentration makes the design of the ion transport module and of the downstream components (for example, combustor) on the purge side considerably easier from a materials standpoint. In the absence of a purge stream, essentially pure oxygen would be produced on the permeate side of the ion transport membrane. Safe handling of such a high purity oxygen stream poses a significant challenge, especially at elevated temperature.

In addition, the concentration of the oxygen in the purge exhaust can be easily controlled by a number of techniques: for example, varying the feed gas stream flowrate, varying the purge gas stream flowrate (increased recycle of the combustion products), changing the ion transport module operating temperature, or varying the membrane area of the ion transport stage. These techniques are also effective in controlling the total amount of oxygen separated and could be used for load tracking purposes.

Lastly, the use of the ion transport separator would eliminate the need for a stand-alone oxygen generator (for example, PSA) or an oxygen supply system (for example, liquid tank and vaporizer). This is expected to yield substantial reduction in capital cost and in the cost of the oxygen produced.

It should be noted that a number of modifications of the process are possible within the spirit of the process configuration discussed above. For example, it may be advantageous to use the exhaust gas from the downstream process to heat the feed gas stream. It is also possible to add some air to the purge gas stream exiting the ion transport module. This may be particularly desirable for start-up operations or for load tracking purposes. In addition, although the processes described here are for mixed conductor pressure-driven ion transport membranes, it is obvious that the inventive concept is also applicable to primarily ionic conductors that are operated in the pressure- or electrically-driven mode with an external current return. Lastly, although a countercurrent oxygen separation process is depicted in FIG. 1, the same process can also be carried out in a cocurrent or a crossflow mode.

As mentioned above, the terms "solid electrolyte ionic conductor", "solid electrolyte", "ionic conductor", and "ion transport membrane" are generally used herein to designate either an ionic-type (electrically-driven) system or a mixed conductor-type (pressure-driven) system unless otherwise specified.

The term "nitrogen" as used herein will usually mean oxygen-depleted gas, that is, oxygen-depleted relative to the feed gas. As discussed above, the ion transport membrane only allows oxygen permeation. Therefore, the composition of the retentate will depend on the composition of the feed gas. The feed gas will be depleted of oxygen but will retain nitrogen and any other gases (for example, argon) present in the feed gas. The meaning of the term will be clear to one of skill in the art in the context of the use of the term in light of the invention as disclosed herein.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

The term "high purity" refers to a product stream which contains less than five percent by volume of undesired gases. Preferably the product is at least 98.0% pure, more preferably 99.9% pure, and most preferably at least 99.99% pure, where "pure" indicates an absence of undesired gases.

"Pressure-swing adsorption" or "PSA" systems refers to systems using adsorption materials which are selective for a gas, typically nitrogen, to separate that gas from other gases. Such materials include rate-selective PSA materials, which are usually carbon-containing and provide high pressure nitrogen and low pressure oxygen, and equilibrium-selective PSA materials, which are usually lithium-containing and provide low pressure nitrogen and high pressure oxygen.

Specific features of the invention are shown in one or more of the drawings for convenience only, as each feature may be combined with other features in accordance with the invention. In addition, various changes and modifications may be made to the examples given without departing from the spirit of the invention. Such modifications may include the use of pressure-swing and thermal-swing adsorption beds or other methods of bulk oxygen separation to provide the function of the polymeric membranes discussed above. Alternative embodiments will be recognized by those skilled in the art and they are intended to be included within the scope of the claims.

What is claimed is:

1. A process for separating a feed gas stream containing elemental oxygen into an oxygen-enriched gas stream and an oxygen-depleted gas stream wherein the oxygen-enriched gas stream is used in a combustor, said process comprising:

(a) compressing the feed gas stream;
   (b) separating the oxygen from the compressed feed gas stream using an ion transport module including an ion transport membrane having a retentate side and a permeate side to separate a purified oxygen gas stream on the permeate side and correspondingly depleting the oxygen on the retentate side to produce the oxygen-depleted gas stream, the purified oxygen gas stream mixing with other gas components on the permeate side to form the oxygen-enriched gas stream; and
   (c) purging the permeate side of the ion transport membrane with at least a portion of a combustion product gas stream obtained from the combustion in the combustor of the gas stream exiting the permeate side of the ion transport module.

2. The process according to claim 1, wherein the feed gas stream is air.

3. The process according to claim 1, wherein the combustion product gas stream used to purge the permeate side of the ion transport membrane includes a reactive gas that reacts with the purified oxygen gas stream permeating through the ion transport membrane.

4. The process according to claim 1, further comprising:
   cooling the combustion product gas stream before it is used to purge the permeate side of the ion transport membrane.

5. The process according to claim 1, wherein the gas stream exiting the permeate side of the ion transport module has an oxygen concentration of from about 10% to about 90%.

6. The process according to claim 1, further comprising:
   heating the compressed feed gas stream before it is fed into the ion transport module.

7. The process according to claim 1, wherein the combustor is integrated with the ion transport module on the permeate side of the ion transport membrane.

8. The process according to claim 1, wherein at least a portion of the combustion product gas stream is used in a downstream process.

9. The process according to claim 8, wherein both the combustor and the downstream process are integrated with the ion transport module on the permeate side of the ion transport membrane.

10. The process according to claim 8, wherein at least a portion of a downstream product gas stream from the downstream process is used to purge the permeate side of the ion transport membrane.

11. The process according to claim 8, wherein an oxygen-containing gas stream is added to at least a portion of a downstream product gas stream from the downstream process and the resultant gas stream is passed through an afterburner to burn any fuel that remains in the downstream product gas stream.

12. The process according to claim 11, wherein the oxygen-containing gas stream is at least a portion of the compressed feed gas stream and the downstream product gas stream from the downstream process is added to the oxygen-depleted gas stream from the ion transport module before the resultant gas stream is passed through an afterburner to burn any fuel that remains in the downstream product gas stream.

13. The process according to claim 8, wherein the downstream process is an oxidation of metals.

14. The process according to claim 8, wherein the downstream process is a purification of metals by oxidizing impurities in the metals.

15. The process according to claim 8, wherein the downstream process is a blast furnace.

16. The process according to claim 8, wherein at least a portion of the oxygen-depleted gas stream is also used in the downstream process.

17. The process according to claim 1, wherein the oxygen-enriched gas stream entering the combuster contains less than 10% nitrogen.

18. A process for separating a feed gas stream containing elemental oxygen into an oxygen-enriched gas stream, said process comprising:

(a) compressing the feed gas stream;

(b) separating the oxygen from the compressed feed gas stream, using an ion transport module including an ion transport membrane having a retentate side and a permeate side, to separate a purified oxygen gas stream on the permeate side and correspondingly depleting the oxygen on the retentate side to produce the oxygen-depleted gas stream, the purified oxygen gas stream mixing with other gas components on the permeate side to form the oxygen-enriched gas stream;

(c) using the oxygen-enriched gas stream in a combustor integrated with the ion transport module on the permeate side of the ion transport membrane; and (d) purging the permeate side of the ion transport membrane with at least a portion of a combustion product gas stream obtained from the combustion in the combustor of the gas stream exiting the permeate side of the ion transport module.

* * * * *